United States Patent [19]

Charlebois et al.

[11] Patent Number: 4,670,980

[45] Date of Patent: Jun. 9, 1987

[54] MANUFACTURE OF SEALING CLOSURES FOR A TELECOMMUNICATIONS CABLE SPLICE

[75] Inventors: Leonard J. Charlebois, Kanata; Allan P. Brown, Ottawa; James K. Kho, Nepean, all of Canada

[73] Assignee: Northern Telecom Limited, Montreal, Canada

[21] Appl. No.: 800,834

[22] Filed: Nov. 22, 1985

[30] Foreign Application Priority Data

Jun. 28, 1985 [CA] Canada ................................. 486024

[51] Int. Cl.4 .................. B22D 19/04; B28B 7/26; B29C 39/10; H01R 43/00
[52] U.S. Cl. .......................................... 29/869; 156/49; 249/90; 249/95; 249/119; 249/219 R; 264/36; 264/251; 264/279.1; 425/11
[58] Field of Search ................ 264/1.5, 36, 279.1, 264/251; 249/90, 95, 119, 219 R; 425/11; 156/49, 48, 51, 56; 174/93; 29/868, 869, 870, 871

[56] References Cited

U.S. PATENT DOCUMENTS

| 2,908,744 | 10/1959 | Bollmeier | 249/90 X |
| 4,061,872 | 12/1977 | DeMonsy et al. | 249/90 X |
| 4,570,032 | 2/1986 | Charlebois et al. | 156/49 X |
| 4,581,480 | 4/1986 | Charlebois | 156/49 X |

Primary Examiner—Jan H. Silbaugh
Assistant Examiner—Leo B. Tentoni
Attorney, Agent, or Firm—R. J. Austin

[57] ABSTRACT

Making a gas pressurizable closure for a splice region of a telecommunications cable in which plastic ends of the closure are molded in position by locating molds for the ends in axially spaced-apart positions one at each side of the splice region. While the cable is allowed to follow its natural path through and between the molds, the molds are held fixed relative to one another and aligned with one another and the plastic ends are molded. A shroud means of the closure is then located between and sealed to the plastic ends with the cable still following its natural path.

1 Claim, 16 Drawing Figures

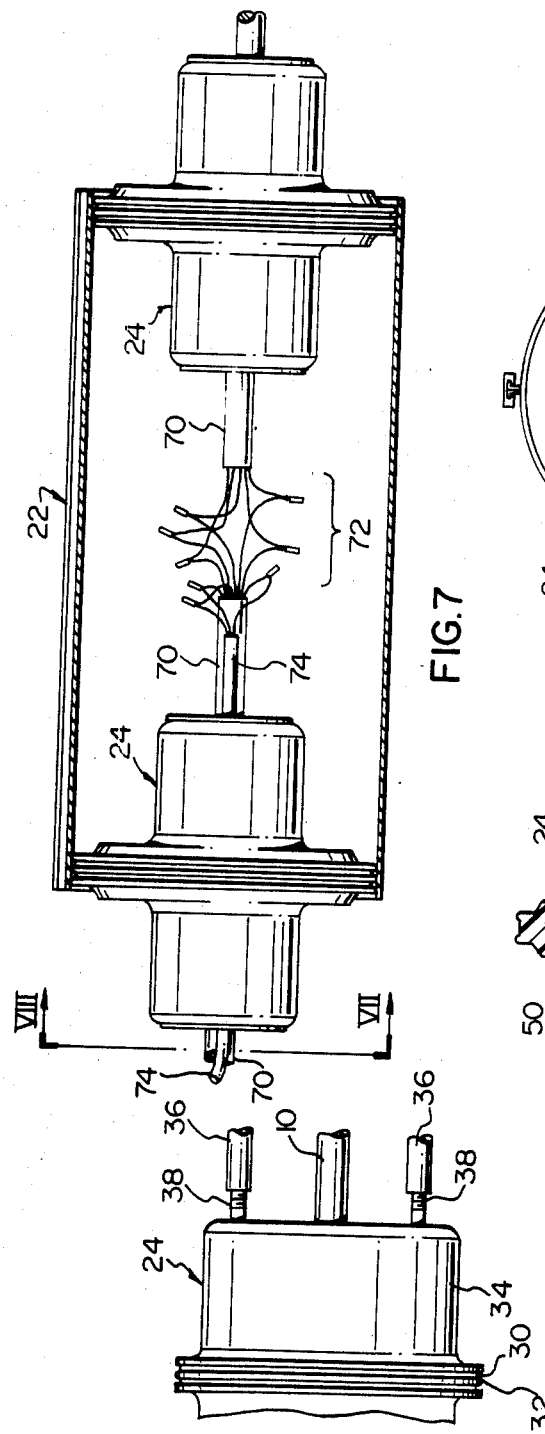
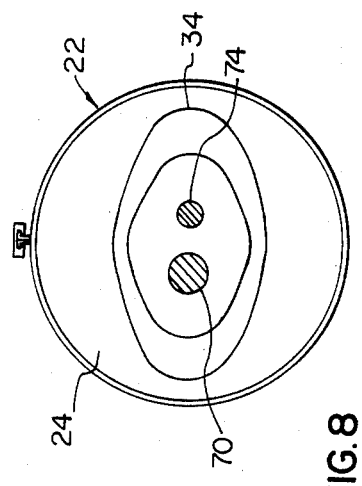
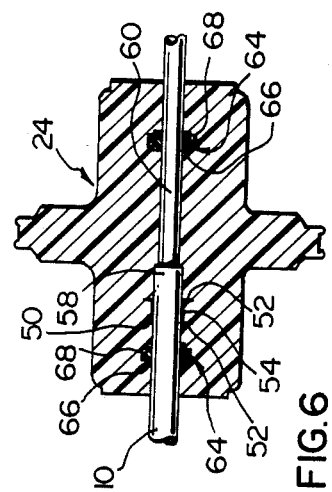

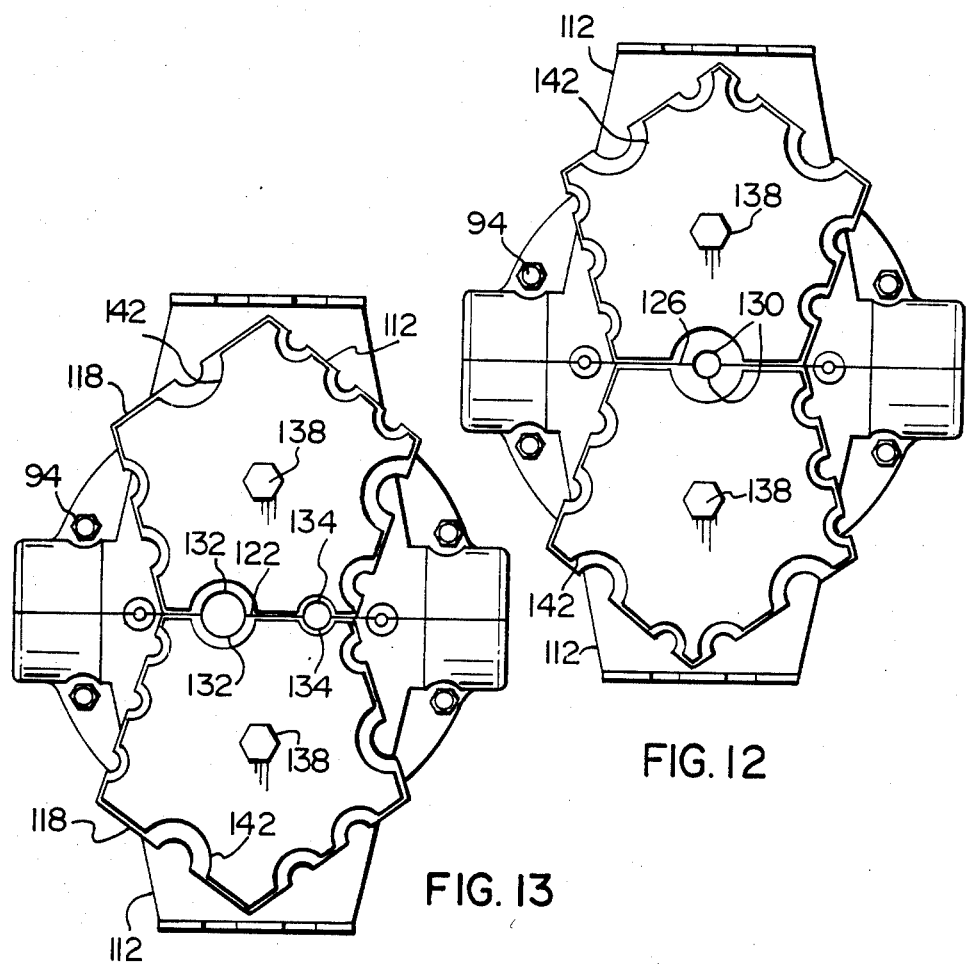
FIG. 12
FIG. 13
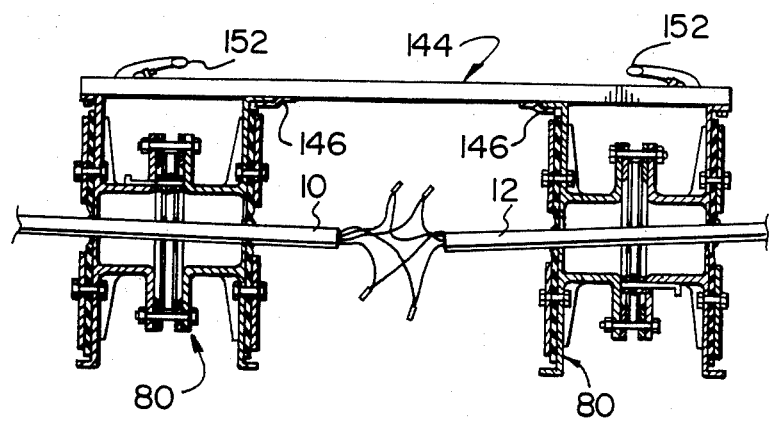
FIG. 14

MANUFACTURE OF SEALING CLOSURES FOR A TELECOMMUNICATIONS CABLE SPLICE

This invention relates to the manufacture of sealing closures for telecommunications cable splices.

When installing a telecommunications cable system, it is conventional practice to splice together conductors of succeeding cables and also to splice together conductors of a cable with other conductors of branch cables which lead from it. Such branch cables may be in the form of drop wires for connection to customers' premises or cables having fewer pairs of conductors than the main cable and provided for connecting telephone equipment in a localized area with the main cable. The cables need to be opened for any splicing operation between conductors and, subsequent to the splicing operation, it is necessary to seal the spliced region from ambient atmosphere to prevent moisture from contacting the spliced conductors. One effective method of sealing spliced together conductors is as described in U.S. Pat. No. 4,322,573 granted Mar. 30, 1982 to L. J. Charlebois and entitled "Encapsulation of Telecommunications Cable Splices". That particular patent concerns the wrapping of overlapping and contacting windings of sealing tape around the connections of the bared conductor ends and then enclosing the splices by injection molding an encapsulation of molten plastic material. This encapsulation is molded around the sealing tape wrapping so as to encapsulate each splice and to soften the sealing tape to merge it into a single mass so as to cause the mass to completely enclose the conductor ends and connections and to provide a seal at each splice. This particular arrangement of sealing closure is for use with unpressurized cable.

In U.S. Pat. No. 4,570,032, issued Feb. 2, 1986 for an invention entitled "Sealing Enclosure For A Cable Splice" and in the names of L. J. Charlebois and K. H. Dick, a method is described for providing a sealing closure in which a new type of seal is used between the closure and cable jacket. In one embodiment as described in that application, a sealing closure is described for a splice region of a gas pressurizable cable. A similar embodiment is described in U.S. Pat. No. 4,581,480 issued Apr. 8, 1986 in the name of L. J. Charlebois and entitled "Cable Splice Closure and Strain Relief".

A problem concerns the making of a gas pressurizable closure for a splice region as described for instance in the above-mentioned U.S. Pat. No. 4,581,480. As described in that patent application, plastic ends of the closure are molded in spaced positions before bridging them with a shroud means which is sealed around the periphery of the ends and bridges the splice region. This operation normally takes place in the field and it is in these surroundings that the ends are molded in their respective positions. Of course, in an in-field situation, the cable path has already been determined because of the manner in which it was previously laid. It has been considered necessary to remove, as far as possible, any slight curvature in the natural path of the cable across the splice region so as to axially align the ends before locating the shroud means in position. However any tendency for the cable to return towards such a curved shape may distort the assembled closure and cause seal breakage between the shroud means and the plastic ends.

The present invention provides a method of overcoming the above problems.

Accordingly, in a method of molding plastic ends for a gas pressurizable closure for a splice region of a telecommunications cable in which the closure has axially spaced molded plastic ends and a bridging shroud means the method including molding the ends in position by disposing two molds for the ends in axially spaced-apart positions one at each side of the splice region; and with the cable allowed to follow the path it would follow in the absence of the molds through and between the molds, holding the molds fixed relative to one another in desired positions aligned with one another that they will occupy in the finished closure; and molding the ends while holding said molds in said positions.

Preferably, the molds are held in their aligned positions by a rigid clamping bar which is positioned axially across the cable splice and is clamped to each mold.

The invention also includes a low pressure molding apparatus for molding plastic ends of a gas pressurizable closure, one axially at each side of a splice region of a telecommunications cable, the apparatus comprising two molds, each for molding one of the plastic ends, a rigid mold clamping bar, and locking means for securing the molds in spaced-apart positions to the clamping bar and in axial alignment with one another.

With the above-described method and use of the apparatus, as the cable follows its natural (i.e. the path it would follow the absence of the molds) path during the formation of the plastic ends and with the molds disposed in aligned positions, then there is no movement of the cable nor of the ends after the molding procedure and thus no distortion of the assembled enclosure takes place.

One embodiment of the invention will now be described by way of example, with reference to the accompanying drawings, in which:

FIG. 5 is a view in the direction of arrow V in FIG. 1;

FIG. 6 is a cross-sectional view through a molded plastic end of the closure;

FIG. 7 is a view similar to FIG. 1 of a modification of the embodiment;

FIG. 8 is an end view of an end of the closure of the modification taken in cross-section through the cable along line VIII—VIII;

FIG. 12 is a view similar to FIG. 10 and showing the sealing members in position for molding a plastic end around the cable to provide the construction shown in FIG. 1;

FIG. 13 is a view similar to FIG. 12 with the sealing members adjusted in position and for making a plastic end according to the modification shown in FIGS. 6 and 7;

FIG. 14 shows the assembly of the molds in spaced-apart positions upon a cable during molding of the end caps;

Figures 1, 2, 3, 4:
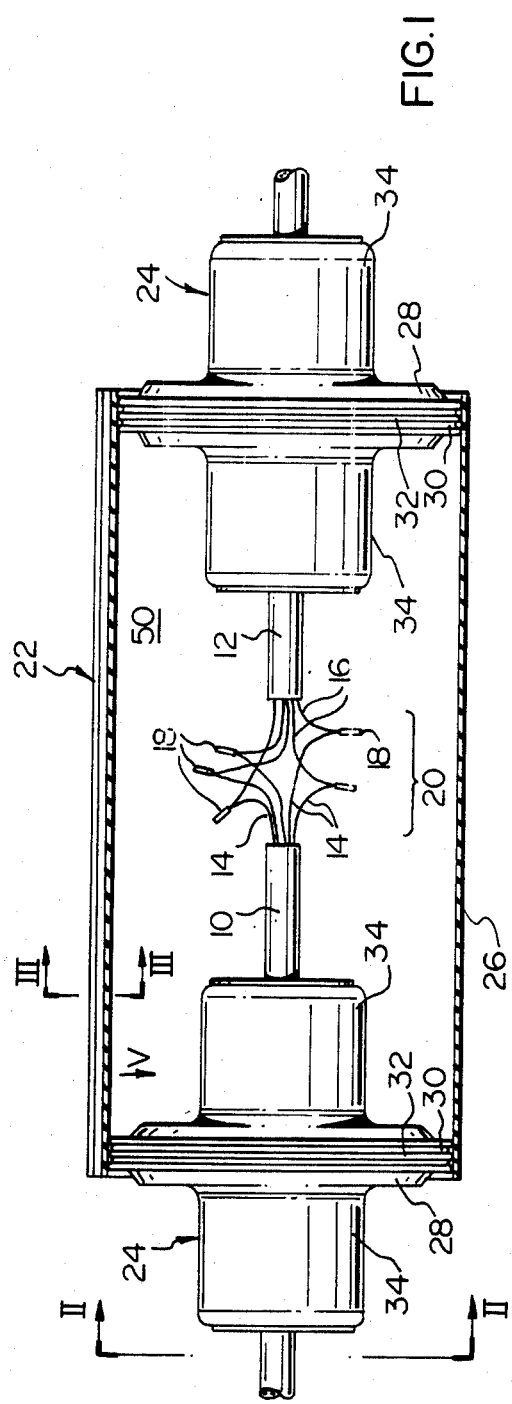
FIG. 1 is a side elevational view, partly in cross-section of a gas pressurizable closure surrounding a splice region of cable.
FIG. 2 is a view on the end of the closure taken in cross-section through the cable along line II—II in FIG. 1.
FIG. 3 is a cross-sectional view taken along line III—III in FIG. 1 of part of the closure to show a detail.
FIG. 4 is a view in the direction of arrow IV in FIG. 3.

As shown by FIG. 1, two end sections 10 and 12 of pressurizable cables have their conductors 14 and 16 extending outwardly beyond the ends of the cable jackets and sheaths. Each conductor of one cable is connected to a conductor of the other cable to form a splice 18. Each splice and any bare conductor ends leading to it are electrically isolated from other splices in conventional fashion with insulating wrapping material.

The splice region 20 formed along the axial lengths of the cables by the splices 18 is provided with a gas pressurizable closure 22. As can be seen from FIG. 1, the closure 22 comprises two molded plastic ends 24 which are spaced-apart one at each axial side of the splice region and surround the cable end sections 10 and 12. The closure also includes a sheath means 26 which is formed into substantially cylindrical condition from a flexible sheet material such as steel which is wrapped around the two plastic ends to form a sleeve. As will be described, the sleeve is sealed to each of the plastic ends 24 and the closure 22 is generally of a construction such as is described in U.S. Pat. No. 4,581,480, issued Apr. 8, 1986 and entitled "Cable Encapsulation And Strain Relief" in the name of L. J. Charlebois.

To discuss the closure 22 in greater detail, each plastic end 24 has a main or large diameter disc-shaped section 28. This section 28 has an annular groove 30 within which is disposed a compressible plastic seal 32 which is also sealed against the inside surface of the shroud means 26. Extending from each side of the section 28 is an axial extension 34 which, as is clear from FIGS. 1, 2 and 5 is of oval or elliptical shape in axial view for reasons to be discussed.

The two plastic ends 24 are connected together by two tensile strength members 36 (see particularly FIG. 5) which are either steel bars or tubes extending between and screw-threadedly connected to screw-threaded studs 38 which are molded integrally with the inwardly facing extensions 34 and extend therefrom for securing to the bars 36. The tensile members 36 and studs 38 are omitted from FIG. 1 to show the cable end sections in more detail. As described in the aforementioned U.S. Pat. No. 4,581,480, the bars and studs act to ensure that tensile loads such as are produced in the cable do not cause the cables and thus the plastic ends to pull apart. As discussed in the latter mentioned application, such an arrangement is particularly useful in the case of aerial cable.

The sheet forming the shroud means 26 has side edges 40 which are bent to form a U-shape as shown in FIG. 3, and the bases of the two U-shapes oppose each other and hold between them two axially extending seals 42 for fluid tightly sealing the confronting edges of the sheets. To hold the edges sealed together, arms 44 of each U-shape increase in length from one end of the sleeve towards the center of the closure and metal locking devices 46 are provided of C-shaped cross-section and also of tapering shape as shown by FIG. 4. Each device 46 conforms to the combined shape of the opposing arms 44 and is mounted upon the side edges 40 from an end of the sleeve as shown by FIG. 4, so as to interlock with the U-shaped configuration. The locking devices force the edges 40 together so that they seal upon the seals 42. Securing pins 48 are then inserted through aligned holes through the locking devices 46 and the U-shaped edges 40 to hold the assembly together. The plastic ends and the shroud means then provide an enclosed chamber 50 which surrounds the splice region and which is sealed from ambient atmosphere while also providing a substantial seal to prevent pressurized gases from escaping from within the arrangement. As shown by FIG. 6, each plastic end 24 is provided with a strain relief device which is in series with the bars 36 in transferring tensile loads from one cable to the other. This strain relief device comprises a strap member 50 which is bent around each of the cable end sections 10 and 12 and has flanges 52 upstanding from a base 54 which contacts the cable. Each of the bases is formed with a piercing means in the form of prongs (not shown) which project into the cable jacket to hold the base in position as the plastic ends are molded in position, the flanges then becoming embedded in the material of the encapsulations formed by the plastic ends. Thus, after manufacture, if any tensile load is placed along the enclosed splice region then this load is taken from each cable jacket through the prongs into the base of the strap member and then from the flanges 52 into the plastic end. The tension is then transferred to the other plastic end by the bars 36. The structure of the strain relief device is described in more detail in copending U.S. Pat. No. 4,581,480 as referred to above.

Within each of the plastic ends 24, there is disposed a seal arrangement to prevent pressurized air from escaping from the chamber 50 along the interfacial region between the associated cable and the plastic end. This seal acts effectively to seal between the jacket surface and the plastic end in a case where a single jacket is provided upon a cable. In this embodiment however each cable is formed with two jackets 58 and 60, one disposed within the other. In addition to preventing the pressurized air from escaping to ambient atmosphere, it is also necessary to prevent the air from escaping along the cable itself, i.e. along the outside surface of the inner jacket 60 at its interface with any surrounding layer of material. To provide the effective seal, therefore, and as shown by FIG. 6, the outer jacket 58 is removed for a further distance along each of the cables so that the inner jacket 60 projects further towards the splice region. As is then shown, the end 62 of the jacket 58 terminates within the plastic end and a seal 64 is provided around each of the jackets 58 and 60. Each seal is of a construction described in U.S. Pat. No. 4,570,032, issued Feb. 2, 1986 and entitled "Sealing Closure For A Cable Splice" in the names of L. J. Charlebois and K. H. Dick. As described in the latter application, each seal 64 comprises an inner wrapping 66 of a material which is deformable so that under compression it will intimately engage the surface of the jacket so as to form a first seal with the jacket. Such a material for the inner layer is an ethylene-propylene rubber. An outer layer 68 which is wrapped around it, needs to be a resilient tape material which is stretched very tightly so as to provide the required compressive force upon the layer 66. This outer layer may be a neoprene rubber tape or that known as "DR Tape" in the telecommunications cable industry. With this construction, because the layer 66 in the final structure is compressed, it forms a permanent compressive seal against the outer surface of its respective jacket, and the outer regions of the layer 66 which form an interface with the encapsulation or plastic end 24 are bonded thereto during the encapsulation process by heat softening of the ethylene-propylene rubber. The outer layer 68 is axially narrower than the layer 66 so as to provide interfacial regions of the layer 66 with the encapsulation at the edges of layer 66. It follows that when the encapsulation of the plastic end is formed by a molding process, to be described, then a seal is provided by each seal 64 thereby preventing the escape of pressurized gas from the chamber notwithstanding that the encapsulation itself is not bonded to the jacket of either of the cables as will be discussed below.

As is shown by FIG. 2, each of the cable end sections 10 and 12 passes substantially concentrically through its plastic end 24. However, the plastic end is formed in such a way as to enable more than one cable to extend through it. For instance, in the modification shown in FIGS. 7 and 8, a cable 70 passes completely through the closure 22 from end-to-end and is opened by removal of the jacket and sheath along the region 72 to reveal conductors of the core to enable a service cable 74 to have its conductors spliced to certain conductors of the cable 70. The cable 70 proceeds through the plastic end 22 on the right-hand side of FIG. 7 in the manner shown in the first embodiment for cable end sections 10 and 12. However, the cables 70 and 74 pass through the plastic end on the left-hand side of FIG. 7 in spaced-apart positions, as shown by FIG. 8, and each cable is surrounded with seals similar to seals 68 described in the first embodiment to prevent pressurized air from escaping along the outsides of the cables from chamber 50. Thus the cables, in passing through the plastic end 24, lie in the relationship shown by FIG. 8. As can be seen, the oval or elliptical shape of the extensions 34 allow for such an arrangement of cables disposed in spaced positions through the molding and substantially on the major axis of the projections.

Figure 10:
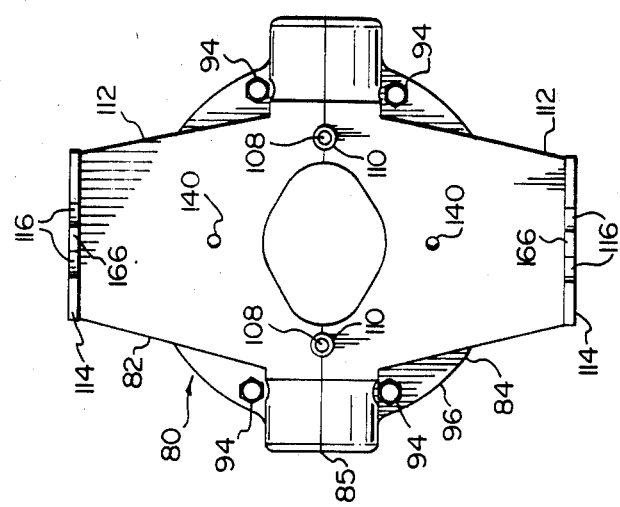
FIG. 10 is a view of the mold in the direction of arrow X in FIG. 9 and with end seals removed for clarity.
Figure 9:
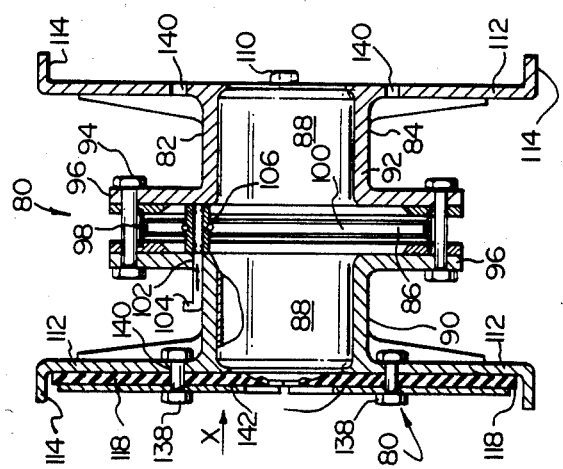
FIG. 9 is a cross-sectional view through a mold used for molding a plastic end during the making of the closure of FIG. 1.

The plastic ends 24 as described in the embodiment and in the modification, are each molded within a mold shown by FIGS. 9, 10, 11, 12 and 13. As shown in FIGS. 9 and 10, a mold 80 is a low pressure mold operating below 20 psi and has two mold halves 82 and 84 hinged at one side 85 (by a hinge not shown). As shown in the section in FIG. 9, the mold halves 82 and 84 have a cavity with a central large diameter section 86 for forming the disc-shaped section 28 of a plastic end. The cavity also comprises two cavity sections 88 at each side of the section 86 for forming the extensions 34 on the plastic end. Each mold half 82 and 84 is formed by two parts 90 and 92 which are bolted together by bolts 94 passing through annular flanges 96 which, together with an annular ring 98, forms the large diameter section 86. The annular groove 30 in a plastic end is formed by an annular insert 100 fitted into the ring 98 as shown in FIG. 9. The mold parts are made from metal and the surfaces of the parts forming the mold cavity have a thermally insulating coating of approximately 0.010 inches thickness. This coating is an epoxy resin, but alternatively could be formed from other thermally insulating material such as polytetrafluorethylene. Alternatively, strips of polyvinylchloride may be used as the coating with a suitable adhering material disposed between the polyvinylchloride and the metal surface to prevent the coating from stripping from the surface. Also, as shown in FIG. 9, the mold has an orifice 102 in one of the flanges 96 for accepting a withdrawal pin 104 which holds a metal tubular insert 106 in a position extending across the recess 86 of the mold cavity. This insert is for providing a passage through the disc-shaped section 28 of a finished plastic end 24 for the purpose of pressurizing the inside of the chamber 50 or for attaching an instrument for measuring the gas pressure within the chamber. At each end of the mold there are provided two holes 108 (FIG. 10) which are formed at the parting line between mold halves and flank an orifice in the mold at the ends of the cavity section 88 as shown in FIG. 9. These two holes are for accepting the studs 38 (see FIG. 4) which pass into the extensions 34 of the plastic end. A local thickening 110 of the mold is provided for aligning the studs 38 correctly during the molding process.

Each of the mold halves 82 and 84 is also provided at its ends with axially aligned tapering flanges 112 as shown by FIGS. 9 and 10. At each mold end, flanges are diametrically opposed from one mold half to the other and are provided at their tapered extremities with outwardly turned side flanges 114. The flanges 114 of each mold half are axially aligned (FIG. 9) and each of these flanges is formed with two spaced recesses 116 (FIG. 10) which are symmetrically disposed with regard to a vertical centerline of the mold. The use of these recesses will be discussed below. With the mold closed, the diametrically opposed flanges provide a planar end face for each mold end (FIG. 9).

Figure 11:
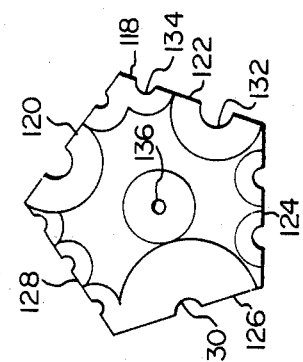
FIG. 11 is a plan view of a sealing member used as part of a seal for sealing the ends of the mold.

The aluminum mold shown in FIGS. 9 and 10 is also equipped at each end with a seal which is not shown in FIG. 10 and is shown at one end only of FIG. 9. As shown in FIGS. 11, 12 and 13, the seal at each end of the mold comprises two planar sealing members 118 each of which, in plan view, has a pentagonal-shaped body (FIG. 11). This shape produces five edge regions 120, 122, 124, 126 and 128 each of which is formed with substantially semi-circular sealing edges which are of different diameter or the number and/or diameter of which is different from one edge region to the other. For instance, for sealing around cable end sections 10 or 12, as shown in the first embodiment, the edge 126 is provided for this purpose. As shown in FIG. 11, this edge is formed with a single semi-circular sealing edge 130. However for the formation of the modification described with reference to FIGS. 7 and 8, the edge region 122 is formed with two semi-circular sealing edges 132 and 134 which are provided one for each of the cables 70 and 74. Each sealing member 118 is formed with a central orifice 136, and means in the form of a bolt and nut arrangement 138 (FIGS. 12 and 13) is used for mounting each of the sealing members upon the planar end face of its respective mold half by passage of the bolt through the orifice 136 and through a corresponding orifice 140 in the mold half (see FIGS. 9 and 10).

In use, each of the sealing members is rotatably movable upon its mounting so as to present any one of the edge regions in an operating position facing across the junction of the mold halves so that it can cooperate with a corresponding edge region of its associated sealing member for sealing completely around a cable or cables issuing from the mold cavity. For instance, as shown in FIG. 12, the edge regions 126 oppose each other along the junction of the mold halves to seal by means of the sealing edges 130 around either of the cables 10 or 12 as described in the first embodiment. Alternatively as shown in FIG. 13, the sealing members may be rotated to a position in which the edge regions 122 oppose each other with the sealing edges 132 and 134 of the two members coacting to seal around the two cables 70 and 74. The other edge regions 120 and 124 are used also for sealing around two cables issuing from the mold cavity in a case where these cables are of different diameters from those described in the modification to the embodiment. The edge regions 128 are used for sealing around certain diameters of three cables issuing from the mold cavity. Thus it is clear that the sealing members of the invention, and as described in this embodiment, provide a plurality of sealing edge regions with different requirements for sealing around cable diameters and numbers of cables issuing from the mold cavity. As a result, less seals or sealing members are required to be carried by a splicing operator into the field than would be the case if single and individual seals were to be used as in conventional practice for sealing in molds.

As shown in FIGS. 9, 12 and 13, the outside surfaces of the sealing members are covered with a reinforcing member in the form of stiffening plate 142 which is shaped appropriately to fit around the sealing edges. The plate is also secured in position by the bolt arrangement 138.

In the molding of each plastic end 24, mold 80 is equipped with the insert 106 if this is required and a layer of ethylene-propylene rubber tape is wrapped around a groove 143 in the insert for the purpose of sealing the insert to the molded article to prevent pressurized air from escaping. After location of the seals 64 and the strap member 50 around the cable end sections at each side of a completed splice region 20, as in the embodiment, the molds are located in position at each side of the splice region. Each mold is filled by passing molten polyethylene material into the mold cavity through an inlet (not shown) and, as the mold fills, the molten material contacts the insulating coating on the metal surface as it flows through the cavity. It has been found that with the use of the insulating coating upon an aluminum mold, then for the particular size of plastic end which is being made in the embodiment, about 20 minutes is sufficient for the molten material to cool and harden sufficiently to allow for removal of the mold. This time factor is satisfactory from a manufacturing point of view. Removal of heat from the mold cavity is initially resisted by the insulating coating but quick withdrawal of heat takes place immediately after the heat passes into the aluminum. Hence, the combination of the coating with the aluminum acts as a combined thermal insulation and heat sink arrangement which is satisfactory for withdrawing heat from the material at the required rate. Also, because of the arrangement of the insulating coating within the mold, upon the molten material contacting the coating as it flows through the mold cavity, then heat is not removed from the immediate surface of the molten material immediately it contacts the insulation as would be the case if it contacted the bare uncovered aluminum. In view of this, the insulating coating allows sufficient time for the material to flow into intimate molding contact with the coating forming the mold surface before solidification of the surface region takes place. Hence, all of the parts of the finished article are smooth even though the operation is performed by low pressure molding. In particular, the molding material contacting the insert 100 also is provided with a smooth molded surface. This material forms the groove 30 in the plastic end and the smooth surface is satisfactory for sealing purposes against the sealing ring 32 which fits within the groove. It follows therefore that with low pressure molding techniques, i.e. below 100 psi and preferably below 20 psi, that the article is molded intimately into contact with the mold surface thereby enabling a smooth molded surface to result. Hence, smooth sealing surfaces may be provided by this technique.

During molding, the molten material is passed into the mold cavity at a temperature of about 204° C. The heat dissipates through the mold sufficiently quickly to prevent softening of the jacket material and fusing the jacket to the encapsulation. This is the case even though the jacket is itself formed from polyethylene. Choosing a different grade polyethylene for the molten material assists in prevention of this fusing action. However, there is sufficient heat retention over a sufficiently long period to soften the edges of the layers 66 of seals 64 and which project beyond the layers 68. These edges of layers 66 then form a bond with the encapsulation to provide a seal.

Appropriately, the two plastic ends 24 are molded into position simultaneously. This is effected according to the invention by providing two molds 80 which are disposed at their required distances apart at each side of the splice region as shown in FIG. 14. The two molds are held in their desired positions axially aligned with one another by a rigid mold clamping bar 144. As shown in greater detail in FIGS. 14 and 15, the clamping bar 144 is in the form of a rigid U-shaped steel bar which is positioned to extend across the flanges 114 at one side of the two molds. The bar 144 has abutment means in the form of two spaced-apart abutment members 146 which provide transverse recesses 148 facing towards adjacent ends of the bar. These recesses are spaced-apart so as to hold a flange 114 of one of the mold halves therein and control the distance apart of the two molds 86. The bar has locking means for securing the molds in the spaced-apart positions with a flange of each mold in a recess 148 and against an associated member 146. This locking means comprises two manually operable, over center, locking devices 150 each provided with a handle 152 pivoted at position 154 to a bracket 156 secured to the bar. The handle 152 has a U-shaped locking member 158 pivotally attached to it and adjacent ends of the member by a cross-yoke 160 through which screw-threaded ends of the member 158 pass, the cross-yoke held in a desired position by lock nuts 162. The base 164 of the locking member is locatable beneath a narrow section 166 of the outer flange 114 and formed between recesses 116 and this base is located in a locking or clamping position (FIG. 16) with the handle 152 in the over center position shown. Arms 168 of locking member 158 pass through recesses 116.

Figure 15:
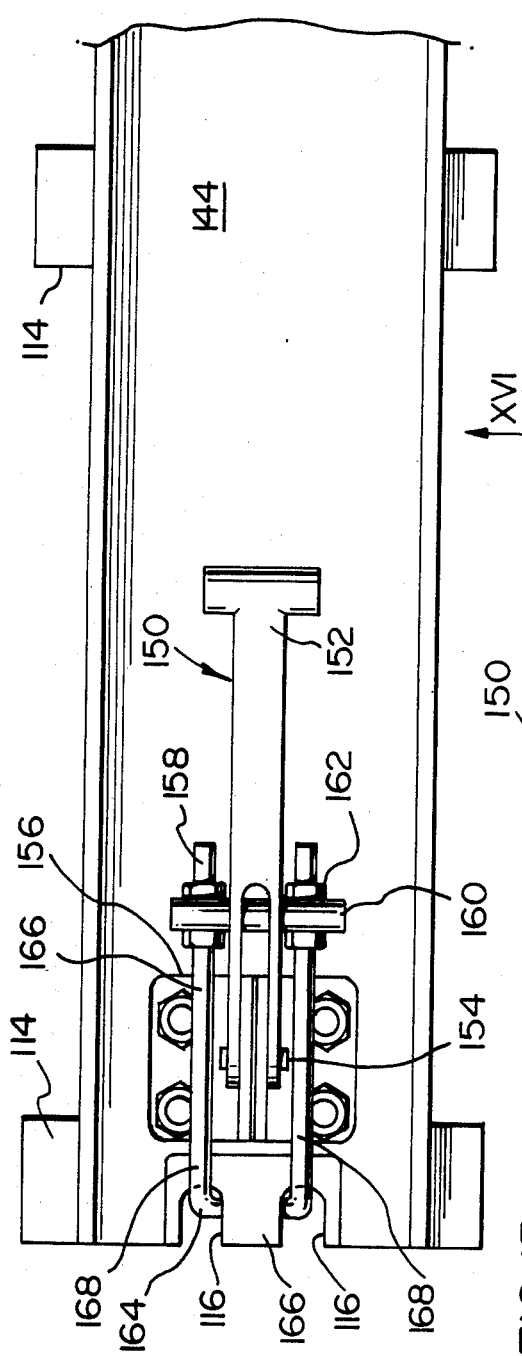
FIG. 15 is a plan view of part of a rigid mold locking bar holding the molds in aligned positions.
Figure 16:
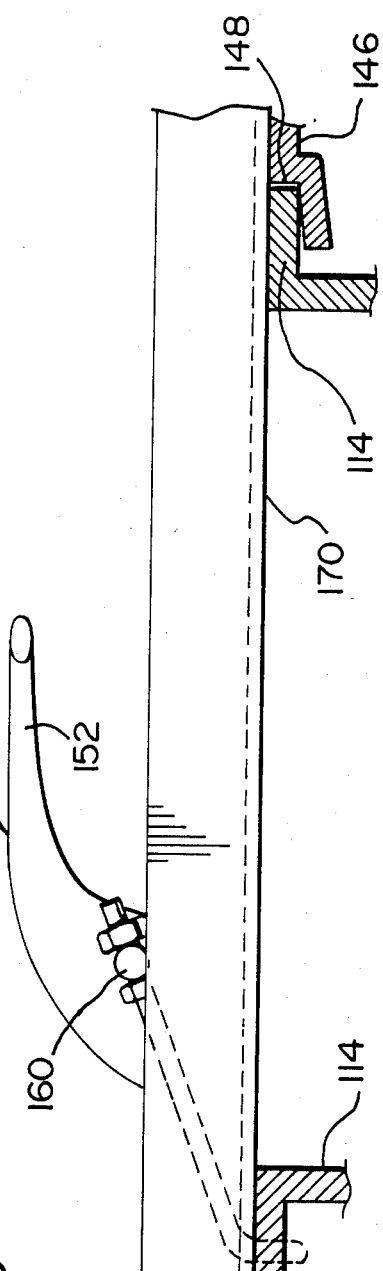
FIG. 16 is a view of part of the locking bar in the direction of arrow XVI in FIG. 14.

The clamping bar is located in position as shown in FIGS. 14 and 15 in which the flanges 114 at that side of the complete assembly of molds and cables all are held firmly against a planar mold flange engaging surface, i.e. the undersurface 170 of the bar, and are retained in their axial positions apart in a mold locking position. This securing of the molds in this fashion ensures that they are axially aligned in the required manner and in their desired positions. If it is found that there is any slight movement of either of the molds out of the aligned positions, then another locking bar 144 (not shown) may be located on the other side of the assembly to hold it more rigidly. With the molds disposed in these aligned positions for the molding operation, the cable or cables passing through them may follow the natural path of curvature through and between the molds as shown in FIG. 14. Hence after the molding operation has been completed, there is no tendency for the cables to return towards a normal curved condition which would have the effect of displacing the plastic ends 24 from their aligned positions in which they are molded. Therefore there is no twisting force imposed upon the plastic ends which would tend to destroy any seal between the plastic ends and the shroud means 26 through the annular seals 32. This method of molding the two plastic ends together therefore removes any possibility of any sideways or twisting forces being applied to the finished closure which would have the tendency to distort the closure and break the gas pressurizable arrangement.

What is claimed is:

1. A method of a gas pressurizable closure for a splice region of a telecommunications cable in which the closure has axially spaced molded plastic ends and a bridging shroud means, the method including molding the ends in position by disposing two molds for the ends in axially spaced-apart positions, one at each side of the splice region; and with the cable allowed to follow the path it would follow in the absence of the molds through and between the molds, holding the molds fixed relative to one another in desired positions aligned with one another that the spaced ends will occupy in the finished closure, and molding the ends while holding the molds in said positions and locating the shroud means in position extending between the plastic ends and sealed thereto with the cable still following said path, such that there is no twisting force imposed upon the plastic ends which would tend to destroy the seal between the plastic ends and the shroud means.

* * * * *